(12) United States Patent
Kasai

(10) Patent No.: US 7,654,295 B2
(45) Date of Patent: Feb. 2, 2010

(54) TIRE FOR MOTORCYCLE WITH SIDEWALL UPPER LAYER AND SIDEWALL LOWER LAYER

(75) Inventor: Katsumi Kasai, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 490 days.

(21) Appl. No.: 11/520,586

(22) Filed: Sep. 14, 2006

(65) Prior Publication Data

US 2007/0095449 A1 May 3, 2007

(30) Foreign Application Priority Data

Oct. 28, 2005 (JP) ............................. 2005-315026

(51) Int. Cl.
*B60C 13/00* (2006.01)
*B60C 15/00* (2006.01)
*B60C 15/04* (2006.01)
*B60C 15/06* (2006.01)

(52) U.S. Cl. .................. 152/525; 152/540; 152/541; 152/543; 152/546

(58) Field of Classification Search ............... 152/525, 152/540, 541, 543, 546
See application file for complete search history.

(56) References Cited

U.S. PATENT DOCUMENTS

| 5,385,193 | A | 1/1995 | Suzuki et al. |
| 2002/0162616 | A1* | 11/2002 | Bernard et al. |
| 2004/0198890 | A1* | 10/2004 | Kanenari |

FOREIGN PATENT DOCUMENTS

| EP | 0 755 811 A2 | 1/1997 |
| FR | 2 624 442 A1 | 6/1989 |
| JP | 2000-351306 A | 12/2000 |

* cited by examiner

*Primary Examiner*—Adrienne C Johnstone
(74) *Attorney, Agent, or Firm*—Birch, Stewart, Kolasch & Birch, LLP

(57) ABSTRACT

A tire 2 comprises a tread 4, a pair of sidewalls 6 extended almost inward in a radial direction from an end 18 of the tread 4, a pair of bead cores 8 positioned on an inside in the radial direction of the sidewalls 6, and a carcass 10 laid between both of the bead cores 8 along insides of the tread 4 and the sidewalls 6. The carcass 10 includes a carcass ply 20. The carcass ply 20 is turned up around the bead core 8. The sidewall 6 has a lower layer 34 positioned on an outside in an axial direction of the carcass ply 20 and an upper layer 36 positioned on an outside in the radial direction of the lower layer 34. The upper layer 36 has a hardness which is equal to or higher than 50 and is equal to or lower than 70. The lower layer 34 has a hardness which is equal to or higher than 70 and is equal to or lower than 100.

7 Claims, 1 Drawing Sheet

TIRE FOR MOTORCYCLE WITH SIDEWALL UPPER LAYER AND SIDEWALL LOWER LAYER

This application claims priority on Patent Application No. 2005-315026 filed in JAPAN on Oct. 28, 2005, the entire contents of which are hereby incorporated by reference.

BACKGROUND OF THE INVENTION

1. Field of the Invention

The present invention relates to a tire for a motorcycle.

2. Description of the Related Art

An improvement of a highway network has advanced and a vehicle is caused to run at a high speed for a long time. A performance of the vehicle has been enhanced remarkably. In a tire to be used in the vehicle, a further enhancement in a critical performance has been demanded.

As a tire for a motorcycle, a radial tire is used. The tire has a carcass including a carcass ply. The carcass ply is turned up around a bead. The bead includes a core and an apex positioned on an outside in a radial direction of the core. The core includes a plurality of non-extensible wires. The apex is formed by vulcanizing a filler rubber. The apex is a crosslinked rubber. The crosslinked rubber has a hardness of 70 or more. The apex contributes to a stiffness of the tire.

A tire is formed by pressurizing and heating a green tire. A method of forming the green tire is as follows. First of all, a ring-shaped bead wire is formed by using the non-extensible wires and a topping rubber. Next, the filler rubber is combined with the bead wire so that a bead ring is formed. In the bead ring, the filler rubber is expanded like a flange outward in a radial direction of the bead wire. Next, a pair of bead rings are fitted in a carcass ply processed cylindrically. The bead rings are disposed in the vicinity of both ends of the carcass ply, respectively. Then, the both ends of the carcass ply are turned up so that the bead ring is enveloped in the carcass ply. Members such as a belt ply, a sidewall rubber and a tread rubber are further combined to form the green tire.

A pneumatic radial tire capable of contributing to a production efficiency has been disclosed in Japanese Laid-Open Patent Publication No. 2000-351306. In the tire, a sidewall includes a bead filler rubber disposed on an outside in an axial direction of a turned-up portion of a carcass ply, an abrasion rubber disposed on an outside in the axial direction of the bead filler rubber, and a sidewall rubber disposed on an outside in the axial direction of the abrasion rubber.

As described above, the manufacture of the tire having the bead constituted by the apex and the core includes the step of forming a bead ring by combining a filler rubber with a bead wire and then enveloping the bead ring in a carcass ply. In the step, the bead ring is laid down in such a manner that a side surface of the bead ring which is positioned on a side of an equator plane of the tire can come in contact with a surface of the carcass ply. The filler rubber expanded like a flange outward in the radial direction of the bead wire is rotated toward the equator plane side at approximately 90 degrees around the bead wire. In the formation of the green tire, a shape of the bead ring is changed. In the manufacture of the tire which includes the step, the step is to be controlled carefully in order to stably form the apex, the core and the carcass ply in proper positions of the tire. A great time and labor is required for manufacturing the tire. In the manufacture of the tire which includes the step, it is hard to further enhance the production efficiency.

In the tire described in the publication, the bead filler rubber is disposed on the outside in the axial direction of the turned-up portion of the carcass ply. In the tire, three types of rubbers including the bead filler rubber are disposed in the sidewall. In the tire, a reduction in a weight thereof is not considered.

It is an object of the present invention to provide a tire for a motorcycle which has an excellent productivity and a weight reduced.

SUMMARY OF THE INVENTION

A tire for a motorcycle according to the present invention comprises a tread having an external surface to form a tread surface, a maximum tire width between ends of the tread, a pair of sidewalls extended almost inward in a radial direction from an end of the tread, a pair of bead cores positioned on an inside in the radial direction of the sidewalls, and a carcass laid between both of the bead cores along insides of the tread and the sidewalls. The carcass includes a carcass ply. The carcass ply is turned up around the bead core. The sidewall has a lower layer positioned on an outside in an axial direction of the carcass ply and an upper layer positioned on an outside in the radial direction of the lower layer. The upper layer has a hardness which is equal to or higher than 50 and is equal to or lower than 70. The lower layer has a hardness which is equal to or higher than 70 and is equal to or lower than 100. When a height in the radial direction from a bead base line to the end of the tread is represented by HT, a height in the radial direction from the bead base line to a lower end of the upper layer is represented by HU and a height in the radial direction from the bead base line to an upper end of the lower layer is represented by HL, a ratio of the height HU to the height HT is equal to or higher than 10% and is equal to or lower than 30%. A ratio of the height HL to the height HT is equal to or higher than 50% and is equal to or lower than 70%. In a straight line passing through a position in which a height in the radial direction from the lower end of the upper layer to the upper end of the lower layer is a half and extended in the axial direction, a ratio of a thickness of the lower layer to that of the upper layer is equal to or higher than 50% and is equal to or lower than 70%.

It is preferable that a ratio of a width in the axial direction on an upper side of the bead core to a width in the axial direction on a lower side of the bead core should be equal to or higher than 30% and be equal to or lower than 70%.

In the tire, the carcass ply is turned up around only the bead core. The tire does not include an apex to be a component for a conventional tire. In the tire, a weight thereof is reduced. In the manufacture of the tire, the step of forming the apex is eliminated. Therefore, the tire is also excellent in a productivity.

DESCRIPTION OF THE PREFERRED EMBODIMENTS

Figure 1:
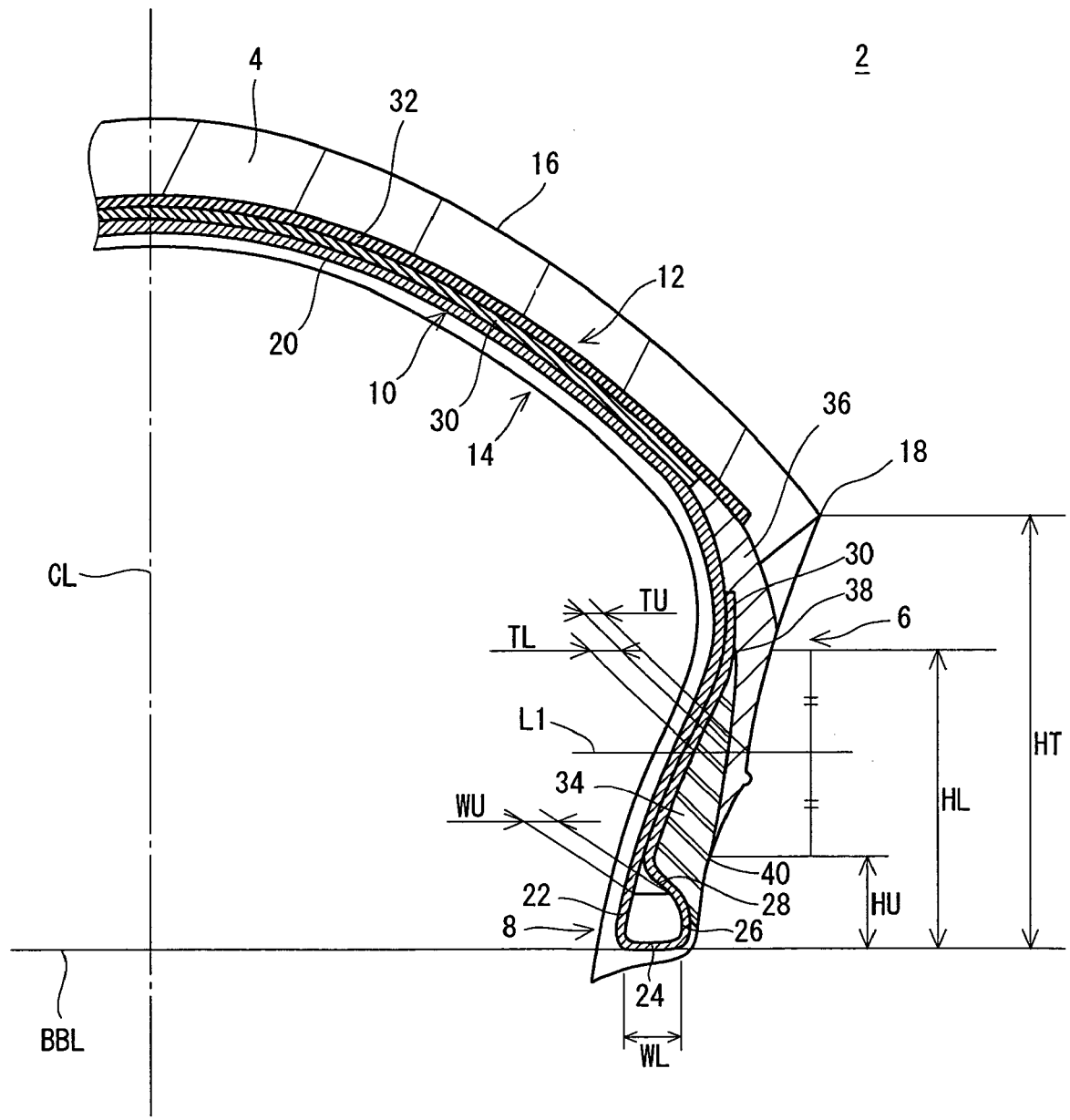
FIG. 1 is a sectional view showing a part of a tire for a motorcycle according to an embodiment of the present invention.

The present invention will be described below in detail based on a preferred embodiment with reference to the drawings.

A tire 2 for a motorcycle shown in FIG. 1 comprises a tread 4, a sidewall 6, a bead core 8, a carcass 10, a belt 12, and an inner liner 14. The tire 2 is a pneumatic tire of a tubeless type. In FIG. 1, a vertical direction is set to be a radial direction of the tire 2 and a transverse direction is set to be an axial direction of the tire 2. A perpendicular direction to a paper is set to be a circumferential direction of the tire 2. The tire 2 takes an almost symmetrical shape about a one-dotted chain line CL in FIG. 1. The one-dotted chain line CL represents an equator plane of the tire 2. A solid line BBL extended in the axial direction represents a bead base line.

The tread 4 is formed by a crosslinked rubber and takes the shape of an outward convex in the radial direction. The tread 4 has an external surface on which a tread surface 16 to come in contact with a road surface is formed. A groove may be provided on the tread surface 16 to form a tread pattern.

The sidewall 6 is extended almost inward in the radial direction from an end 18 of the tread 4. The sidewall 6 absorbs a shock from the road surface. The sidewall 6 prevents the external damage of the carcass 10.

The bead core 8 is positioned on an inside in the radial direction of the sidewall 6. The bead core 8 is ring-shaped and includes a plurality of non-extensible wires (typically, steel wires), which is not shown. The bead core 8 is constituted by the wires and a topping rubber.

The carcass 10 is constituted by a carcass ply 20. The carcass ply 20 is laid between the bead cores 8 on both sides along the insides of the tread 4 and the sidewall 6. The carcass ply 20 is wrapped from an inside toward an outside in the axial direction around the bead core 8. The carcass ply 20 is turned up around the bead core 8. The carcass ply 20 is in contact with an internal surface 22 in an axial direction of the bead core 8. The carcass ply 20 is in contact with an internal surface 24 in a radial direction of the bead core 8. The carcass ply 20 is in contact with an external surface 26 in the axial direction of the bead core 8. The carcass ply 20 is in contact with an external surface 28 in the radial direction of the bead core 8. The tire 2 does not include an apex to be disposed on an outside in the radial direction of the bead core 8 in a conventional tire.

The carcass ply 20 is constituted by a carcass cord and a topping rubber, which is not shown. An absolute value of an angle formed by the carcass cord with respect to an equator plane is usually 60 to 90 degrees. In other words, the tire 2 is a radial tire. The carcass cord is usually constituted by an organic fiber. Examples of a preferable organic fiber include a polyester fiber, a nylon fiber, a rayon fiber, a polyethylene naphthalate fiber and an aramid fiber. Two carcass plies 20 may be used for the carcass 10. In this case, both of the two carcass plies 20 may be turned up around the bead core 8. Either of the two carcass plies 20 may be turned up around the bead core 8.

The belt 12 is positioned on an outside in the radial direction of the carcass 10. The belt 12 is provided on the carcass 10. The belt 12 reinforces the carcass 10. The belt 12 is constituted by an inner belt ply 30 and an outer belt ply 32. Each of the inner belt ply 30 and the outer belt ply 32 is formed by a belt cord and a topping rubber, which is not shown. An absolute value of an angle formed by the belt cord with respect to the equator plane is usually 10 to 35 degrees. An angle formed by the belt cord of the inner belt ply 30 with respect to the equator plane is reverse to an angle formed by the belt cord of the outer belt ply 32 with respect to the equator plane. A preferable belt cord is formed by an organic fiber. Steel may be used for the belt cord. The belt 12 may be formed by spirally winding a ribbon constituted by a belt cord and a topping rubber. In this case, an absolute value of an angle formed by the ribbon with respect to the equator plane is equal to or smaller than 5 degrees.

The inner liner 14 is bonded to the inner peripheral surface of the carcass 10. The inner liner 14 is formed by a crosslinked rubber. A rubber having a low air permeability is used for the inner liner 14. The inner liner 14 plays a part in holding the internal pressure of the tire 2.

As shown in FIG. 1, the sidewall 6 includes a lower layer 34 positioned on an outside in an axial direction of the carcass ply 20 and an upper layer 36 positioned on an outside in a radial direction of the lower layer 34. An upper end 38 of the lower layer 34 is disposed on an outside in the radial direction from a lower end 40 of the upper layer 36. A hardness of the lower layer 34 is higher than that of the upper layer 36. In the tire 2, the lower layer 34 contributes to a stiffness of the tire 2. The upper layer 36 contributes to a shock absorption. The tire 2 is excellent in a handling stability and a ride comfort. The upper layer 36 is formed by crosslinking an upper rubber composition. The lower layer 34 is formed by crosslinking a lower rubber composition.

In the tire 2, the hardness of the upper layer 36 is equal to or higher than 50 and is equal to or lower than 70. The tire 2 having the hardness set to be 50 or more has a high stiffness. The tire 2 is excellent in the handling stability. In this respect, the hardness is more preferably equal to or higher than 54 and is particularly preferably equal to or higher than 58. By setting the hardness to be equal to or lower than 70, it is possible to maintain the shock absorption. The tire 2 is excellent in the ride comfort. From this viewpoint, the hardness is more preferably equal to or lower than 66 and is particularly preferably equal to or lower than 62.

In the tire 2, the lower layer 34 having a high hardness is provided. Therefore, the apex to be the component of the conventional tire can be omitted. The hardness of the lower layer 34 is equal to or higher than 70 and is equal to or lower than 100. The tire 2 having the hardness set to be equal to or higher than 70 has a high stiffness. The tire 2 is excellent in the handling stability. From this viewpoint, the hardness is more preferably equal to or higher than 74 and is particularly preferably equal to or higher than 78. By setting the hardness to be equal to or lower than 100, it is possible to maintain the shock absorption. The tire 2 is excellent in the ride comfort. In this respect, the hardness is more preferably equal to or lower than 96 and is particularly preferably equal to or lower than 92.

In the tire 2, it is preferable that a difference between the hardnesses of the lower layer 34 and that of the upper layer 36 should be equal to or greater than 10 and be equal to or smaller than 30. In the tire 2 in which the difference in the hardness is set to be equal to or greater than 10, the shock absorption can be maintained. The tire 2 has a high stiffness. The tire 2 is excellent in the ride comfort and the handling stability. From this viewpoint, the difference in the hardness is more preferably equal to or greater than 12 and is particularly preferably equal to or greater than 15. The tire 2 having the difference in the hardness set to be equal to or smaller than 30 has a high endurance performance. In this respect, the difference in the hardness is more preferably equal to or smaller than 28 and is particularly preferably equal to or smaller than 25.

In the present invention, the hardness is measured by a durometer of a type A in accordance with the JIS-K6253. The hardness is measured by superposing three sheet-like specimens having a thickness of 1.0 mm cut out of the tire 2. The hardness is measured on the condition that a temperature is 25° C. For the measurement, a specimen formed by crosslinking a rubber composition may be used. In this case, it is possible to obtain the specimen by holding the rubber composition in a mold having a temperature of 160° C. for 10 minutes.

The tire 2 is formed by pressurizing and heating a green tire. A method of forming the green tire is as follows. First of all, a plurality of non-extensible wires and a topping rubber are used to form a ring-shaped bead wire. Next, a pair of bead wires are fitted in the carcass ply 20 processed cylindrically. The bead wires are disposed in the vicinity of both ends of the carcass ply 20, respectively. Then, the both ends of the carcass ply 20 are folded back so that the bead wires are enveloped in the carcass ply 20. Thereafter, the components of the tire 2, for example, the inner belt ply 30, the outer belt ply 32, the upper rubber composition, the lower rubber composition and the tread rubber are combined to form the green tire. A molded body obtained by integrally pushing out the upper rubber composition and the lower rubber composition may be combined with the green tire.

In the manufacture of the tire 2, the bead wire is enveloped in the carcass ply 20 without a combination with a filler rubber. The step of forming a bead ring and the step of enveloping the bead ring in the carcass ply 20 which are included in the conventional tire manufacturing method are omitted. A production efficiency of the tire 2 is higher than that of the conventional tire. The tire 2 is excellent in a productivity.

As described above, the tire 2 has no apex to be the component of the conventional tire. A production cost of the tire 2 is lower than that of the conventional tire. The tire 2 has a smaller weight than that of the conventional tire. The tire 2 is excellent in an operability.

In FIG. 1, a double arrow line HT represents a height in a radial direction from a bead base line to the end 18 of the tread 4. A double arrow line HU represents a height in the radial direction from the bead base line to the lower end 40 of the upper layer 36. A double arrow line HL represents a height in the radial direction from the bead base line to the upper end 38 of the lower layer 34. A solid line L1 extended in an axial direction in parallel with the bead base line is a straight line passing through a position in which a height in the radial direction from the upper end 38 of the lower layer 34 to the lower end 40 of the upper layer 36 is a half. A double arrow line TL represents a thickness of the lower layer 34 on the straight line L1. A double arrow line TU represents a thickness of the upper layer 36 on the straight line L1. A double arrow line WU represents a width in the axial direction on an upper side of the bead core 8. A double arrow line WL represents a width in the axial direction on a lower side of the bead core 8.

In the tire 2, a ratio of the height HU to the height HT is equal to or higher than 10% and is equal to or lower than 30%. The tire 2 having the ratio set to be equal to or higher than 10% has a high stiffness. The tire 2 is excellent in the handling stability. From this viewpoint, the ratio is more preferably equal to or higher than 12% and is particularly preferably equal to or higher than 15%. By setting the ratio to be equal to or lower than 30%, it is possible to maintain the shock absorption. The tire 2 is excellent in the ride comfort. In this respect, the ratio is more preferably equal to or lower than 28% and is particularly preferably equal to or lower than 25%.

In the tire 2, the ratio of the height HL to the height HT is equal to or higher than 50% and is equal to or lower than 70%. The tire 2 having the ratio set to be equal to or higher than 50% has a high stiffness. The tire 2 is excellent in the handling stability. From this viewpoint, the ratio is more preferably equal to or higher than 52% and is particularly preferably equal to or higher than 55%. By setting the ratio to be equal to or lower than 70%, it is possible to maintain the shock absorption. The tire 2 is excellent in the ride comfort. In this respect, the ratio is more preferably equal to or lower than 68% and is particularly preferably equal to or lower than 65%.

In the tire 2, a ratio of the thickness TL to the thickness TU is equal to or higher than 50% and is equal to or lower than 70%. The tire 2 having the ratio set to be equal to or higher than 50% has a high stiffness. The tire 2 is excellent in the handling stability. From this viewpoint, the ratio is more preferably equal to or higher than 52% and is particularly preferably equal to or higher than 55%. By setting the ratio to be equal to or lower than 70%, it is possible to maintain the shock absorption. The tire 2 is excellent in the ride comfort. In this respect, the ratio is more preferably equal to or lower than 68% and is particularly preferably equal to or lower than 65%.

As described above, the bead core 8 includes the wires. In the tire 2, a width in an axial direction of the wire group arranged in an upper stage of the bead core 8 is indicated as the width WU in the axial direction on an upper side of the bead core 8. A width in the axial direction of the wire group arranged in a lower stage of the bead core 8 is indicated as the width WL in the axial direction on the lower side of the bead core 8. The wires in the wire group are arranged in the axial direction. The width in the axial direction of the wire group is obtained by measuring a length between inner surface of the innermost wire in the axial direction and outer surface of the outermost wire in the axial direction.

In the tire 2, a ratio of the width WU in the axial direction to the width WL in the axial direction is equal to or higher than 30% and is equal to or lower than 70%. By setting the ratio to be equal to or higher than 30%, it is possible to maintain the stiffness of the tire 2. The tire 2 is excellent in the handling stability. From this viewpoint, the ratio is more preferably equal to or higher than 35% and is particularly preferably equal to or higher than 40%. By setting the ratio to be equal to or lower than 70%, it is possible to reduce the weight of the tire 2. The tire 2 is excellent in the operability. The turned-up portion of the carcass ply 20 is disposed without bending. A load to be applied to the carcass 10 is distributed. Therefore, the tire 2 is excellent in a durability. In this respect, the ratio is more preferably equal to or lower than 65% and is particularly preferably equal to or lower than 60%.

The dimension and the angle of the tire 2 are measured in a state in which the tire 2 is incorporated in a normal rim and is filled with air to obtain a normal internal pressure. During the measurement, a load is not applied to the tire 2. In this specification, the normal rim implies a rim determined in rules on which the tire 2 depends. A "standard rim" in the JATMA rules, a "Design Rim" in the TRA rules and a "Measuring Rim" in the ETRTO rules are included in the normal rim. In this specification, the normal internal pressure implies an internal pressure determined in the rules on which the tire 2 depends. A "maximum air pressure" in the JATMA rules, a "maximum value" described in "TIRE LOAD LIMITS AT VARIOUS COLD INFLATION PRESSURES" in the TRA rules and an "INFLATION PRESSURE" in the ETRTO rules are included in the normal internal pressure.

EXAMPLES

Example 1

A tire for a motorcycle according to an example 1 which has the basic structure shown in FIG. 1 and specifications shown in the following Table 2 was obtained. The tire has a size of 120/70ZR17. A carcass includes one carcass ply. A carcass cord used in the carcass ply is formed by a nylon fiber. The carcass cord has a fineness of 1400 dtex/2. An angle formed by the carcass cord with respect to an equator plane is 90 degrees. A belt is constituted by an inner belt ply and an outer belt ply. A belt cord used in the inner belt ply and the outer belt ply is formed by an aramid fiber. The belt cord has a fineness of 1670 dtex/2. An angle formed by the belt cord with respect to the equator plane is 30 degrees. An angle formed by the belt cord of the inner belt ply with respect to the equator plane is reverse to an angle formed by the belt cord of the outer belt ply with respect to the equator plane. An upper layer has a hardness of 60. A lower layer has a hardness of 80. A ratio (HU/HT) of a height HU in a radial direction from a bead base line to a lower end of the upper layer to a height HT in the radial direction from the bead base line to an end of a tread is 20%. The ratio (HU/HT) is represented by a value which is obtained by multiplying, by 100, a value calculated by dividing the height HU in the radial direction by the height HT in the radial direction. A ratio (HL/HT) of a height HL in the radial direction from the bead base line to an upper end of the lower layer to the height HT is 70%. The ratio (HL/HT) is represented by a value which is obtained by multiplying, by 100, a value calculated by dividing the height HL in the radial direction by the height HT in the radial direction. A ratio (TL/TU) of a thickness TL of the lower layer to a thickness TU of the upper layer is 60%. The ratio (TL/TU) is represented by a value which is obtained by multiplying, by 100, a value calculated by dividing the thickness TL of the lower layer by the thickness TU of the upper thickness. A ratio (WU/WL) of a width WU in an axial direction on an upper side of a bead core to a width WL in the axial direction on a lower side of the bead core is 50%. The ratio (WU/WL) is represented by a value which is obtained by multiplying, by 100, a value calculated by dividing the width WU in the axial direction by the width WL in the axial direction.

Examples 7 to 11

A tire was obtained in the same manner as in the example 1 except that a ratio (WU/WL) was set as shown in the following Table 2.

Comparative Examples 5 and 6 and Examples 6 and 12

A tire was obtained in the same manner as in the example 1 except that a hardness of an upper layer was set as shown in the following Tables 1 and 2.

Comparative Example 4 and Examples 5, 13 and 14

A tire was obtained in the same manner as in the example 1 except that a hardness of a lower layer was set as shown in the following Tables 1 and 3.

Comparative Examples 3 and 7 and Examples 4 and 15

A tire was obtained in the same manner as in the example 1 except that a ratio (HU/HT) was set as shown in the following Tables 1 and 3.

Comparative Examples 2 and 8 and Example 3

A tire was obtained in the same manner as in the example 1 except that a ratio (HL/HT) was set as shown in the following Tables 1 and 3.

Comparative Examples 1 and 9 and Examples 2 and 16

A tire was obtained in the same manner as in the example 1 except that a ratio (TL/TU) was set as shown in the following Tables 1 and 3.

Comparative Examples 10 and 11

A tire was obtained in the same manner as in the example 1 except that an apex to be a component of the tire was not provided but a sidewall was constituted by a single rubber and a ratio (WU/WL) was set to be 100%. A hardness of a sidewall according to the comparative example 10 is 60. A hardness of a sidewall according to the comparative example 11 is 80.

Conventional Example

As a conventional example, an existing tire put on the market is taken.

[Evaluation of Weight of Tire]

A weight of a trial tire was measured by a weight measuring device. A mean value of the weights of 10 trial tires was obtained. A result of the evaluation is represented by a relative value when the mean value of the conventional example is set to be 100. It is indicated that the weight of the tire is decreased when the numeric value is reduced. The result is shown in the following Tables 1, 2 and 3.

[Static Evaluation]

A trial tire was attached to a testing apparatus to run a static evaluation of a tire. There was measured a load—vertical deflection curve and a load—lateral deflection curve when the trial tire was compressed. A vertical stiffness constant was obtained from an inclination of the load—vertical deflection curve. A lateral stiffness constant was obtained from an inclination of the load—lateral deflection curve. A result of the evaluation is represented by a relative value when the vertical stiffness constant and the lateral stiffness constant of the conventional example are set to be 100. It is indicated that a stiffness of the tire is higher when the numeric value is greater. The result is shown in the following Tables 1, 2 and 3.

[Evaluation of Durability]

A trial tire was attached to a front wheel of a supersports car having a displacement of 600 $cm^3$. A rim has a size of MT 3.50×17. The air of the tire has an internal pressure of 250 kPa. A conventional tire put on the market is attached to a rear wheel. In a circuit course constituted by a dry asphalted road, cornering at a speed of 100 km/h to 150 km/h and straight running at a speed of 250 km/h to a maximum speed of a vehicle (approximately 280 km/h) were executed. A degree of a damage of the tire in the running was examined. A result of the evaluation is represented by a relative value when a durability of the conventional example is set to be 100. It is indicated that the tire is more excellent in the durability when the numeric value is greater. The result is shown in the following Tables 1, 2 and 3.

[Evaluation of Ozone Resistance]

A trial tire was stationarily put in a testing apparatus to evaluate a resistance to ozone and an exposure test for the trial tire was thus carried out. A surface of the trial tire subjected to the exposure test was visually observed to check the generation of a crack. When the cracks were confirmed, the number thereof was measured. A result of the evaluation is represented by a relative value when the number of the conventional example is set to be 100. It is indicated that the tire is more excellent in an ozone resistance when the numeric value is greater. The result is shown in the following Tables 1, 2 and 3.

TABLE 1

Specification of Tire and Result of Evaluation

|  | Conv. Example | Comp. Example 1 | Example 2 | Comp. Example 2 | Example 3 | Comp. Example 3 | Example 4 | Comp. Example 4 | Example 5 | Comp. Example 5 |
|---|---|---|---|---|---|---|---|---|---|---|
| Hardness of upper layer | — | 60 | 60 | 60 | 60 | 60 | 60 | 60 | 60 | 40 |
| Hardness of lower layer | — | 80 | 80 | 80 | 80 | 80 | 80 | 60 | 70 | 80 |
| HU/HT (%) | — | 20 | 20 | 20 | 20 | 5 | 10 | 20 | 20 | 20 |
| HL/HT (%) | — | 70 | 70 | 40 | 50 | 70 | 70 | 70 | 70 | 70 |
| TL/TU (%) | — | 40 | 50 | 60 | 60 | 60 | 60 | 60 | 60 | 60 |
| WU/WL (%) | 100 | 50 | 50 | 50 | 50 | 50 | 50 | 50 | 50 | 50 |
| Weight of tire | 100 | 93 | 93 | 93 | 93 | 93 | 93 | 93 | 93 | 93 |
| Vertical stiffness constant | 100 | 90 | 100 | 90 | 95 | 90 | 95 | 90 | 95 | 90 |
| Lateral stiffness constant | 100 | 90 | 100 | 90 | 95 | 90 | 95 | 90 | 95 | 90 |
| Durability | 100 | 100 | 100 | 95 | 100 | 100 | 100 | 100 | 100 | 100 |
| Ozone resistance | 100 | 100 | 100 | 95 | 100 | 100 | 100 | 100 | 100 | 100 |

TABLE 2

Specification of Tire and Result of Evaluation

|  | Example 6 | Example 7 | Example 8 | Example 1 | Example 9 | Example 10 | Example 11 | Example 12 | Comp. Example 6 |
|---|---|---|---|---|---|---|---|---|---|
| Hardness of upper layer | 50 | 60 | 60 | 60 | 60 | 60 | 60 | 70 | 80 |
| Hardness of lower layer | 80 | 80 | 80 | 80 | 80 | 80 | 80 | 80 | 80 |
| HU/HT (%) | 20 | 20 | 20 | 20 | 20 | 20 | 20 | 20 | 20 |
| HL/HT (%) | 70 | 70 | 70 | 70 | 70 | 70 | 70 | 70 | 70 |
| TL/TU (%) | 60 | 60 | 60 | 60 | 60 | 60 | 60 | 60 | 60 |
| WU/WL (%) | 50 | 10 | 30 | 50 | 70 | 80 | 100 | 50 | 50 |
| Weight of tire | 92 | 92 | 92 | 93 | 94 | 94 | 95 | 95 | 95 |
| Vertical stiffness constant | 95 | 100 | 100 | 100 | 100 | 100 | 100 | 105 | 110 |
| Lateral stiffness constant | 95 | 100 | 100 | 100 | 100 | 100 | 100 | 105 | 110 |
| Durability | 100 | 95 | 100 | 100 | 100 | 95 | 95 | 100 | 95 |
| Ozone resistance | 100 | 100 | 100 | 100 | 100 | 100 | 100 | 100 | 95 |

TABLE 3

Specification of Tire and Result of Evaluation

|  | Example 13 | Example 14 | Example 15 | Comp. Example 7 | Comp. Example 8 | Example 16 | Comp. Example 9 | Comp. Example 10 | Comp. Example 11 |
|---|---|---|---|---|---|---|---|---|---|
| Hardness of upper layer | 60 | 60 | 60 | 60 | 60 | 60 | 60 | 60 | 80 |
| Hardness of lower layer | 90 | 100 | 80 | 80 | 80 | 80 | 80 | 60 | 80 |
| HU/HT (%) | 20 | 20 | 30 | 40 | 20 | 20 | 20 | — | — |
| HL/HT (%) | 70 | 70 | 70 | 70 | 80 | 70 | 70 | — | — |
| TL/TU (%) | 60 | 60 | 60 | 60 | 60 | 70 | 80 | — | — |
| WU/WL (%) | 50 | 50 | 50 | 50 | 50 | 50 | 50 | 100 | 100 |
| Weight of tire | 95 | 95 | 95 | 95 | 95 | 93 | 93 | 95 | 95 |
| Vertical stiffness constant | 105 | 105 | 100 | 105 | 105 | 100 | 100 | 85 | 100 |
| Lateral stiffness constant | 105 | 105 | 100 | 105 | 105 | 100 | 100 | 90 | 100 |
| Durability | 100 | 100 | 100 | 100 | 95 | 100 | 100 | 80 | 95 |
| Ozone resistance | 100 | 100 | 100 | 95 | 100 | 100 | 95 | 100 | 100 |

As shown in the Tables 1, 2 and 3, the weight of the tire is decreased without damaging the performance of the tire according to each of the examples. From the results of the evaluation, the advantages of the present invention are apparent.

The above description is only illustrative and various changes can be made without departing from the scope of the present invention.

What is claimed is:

1. A tire for a motorcycle comprising a tread having an external surface to form a tread surface, a maximum tire width between ends of the tread, a pair of sidewalls extended almost inward in a radial direction from an end of the tread, a pair of bead cores positioned on an inside in the radial direction of the sidewalls, and a carcass laid between both of the bead cores along insides of the tread and the sidewalls, wherein the carcass includes a carcass ply, the carcass ply is turned up around the bead core, the sidewall has a lower layer positioned on an outside in an axial direction of the carcass ply and an upper layer positioned on an outside in the radial direction of the lower layer, the upper layer has a hardness which is equal to or higher than 50 and is equal to or lower than 70, the lower layer has a hardness which is equal to or higher than 70 and is equal to or lower than 100, when a height in the radial direction from a bead base line to the end of the tread is represented by HT, a height in the radial direction from the bead base line to a lower end of the upper layer is represented by HU and a height in the radial direction from the bead base line to an upper end of the lower layer is represented by HL, a ratio of the height HU to the height HT is equal to or higher than 10% and is equal to or lower than 30%, and a ratio of the height HL to the height HT is equal to or higher than 50% and is equal to or lower than 70%, and in a straight line passing through a position in which a height in the radial direction from the lower end of the upper layer to the upper end of the lower layer is a half and extended in the axial direction, a ratio of a thickness of the lower layer to that of the upper layer is equal to or higher than 50% and is equal to or lower than 70%.

2. The tire according to claim 1, wherein a ratio of a width in the axial direction on an upper side of the bead core to a width in the axial direction on a lower side of the bead core is equal to or higher than 30% and is equal to or lower than 70%.

3. The tire according to claim 2, wherein the ratio of a width in the axial direction on an upper side of the bead core to the width in the axial direction on the lower side of the bead core is equal to or higher than 40% and is equal to or lower than 60%.

4. The tire according to claim 1, wherein the upper layer has a hardness which is equal to or higher than 58 and is equal to or lower than 62, and the lower layer has a hardness which is equal to or higher than 78 and is equal to or lower than 92.

5. The tire according to claim 1, wherein the ratio of the height HU to the height HT is equal to or higher than 15% and is equal to or lower than 25%, and the ratio of the height HL to the height HT is equal to or higher than 55% and is equal to or lower than 65%.

6. The tire according to claim 1, wherein the ratio of the thickness of the lower layer to that of the upper layer is equal to or higher than 55% and is equal to or lower than 65%.

7. The tire according to claim 1, wherein the upper layer has a hardness which is equal to or higher than 58 and is equal to or lower than 62, the lower layer has a hardness which is equal to or higher than 78 and is equal to or lower than 92, the ratio of the height HU to the height HT is equal to or higher than 15% and is equal to or lower than 25%, the ratio of the height HL to the height HT is equal to or higher than 55% and is equal to or lower than 65%, and the ratio of a thickness of the lower layer to that of the upper layer is equal to or higher than 55% and is equal to or lower than 65%.

* * * * *